(No Model.)
J. F. BORCHARDT.
CLINOMETER.
No. 326,390. Patented Sept. 15, 1885.
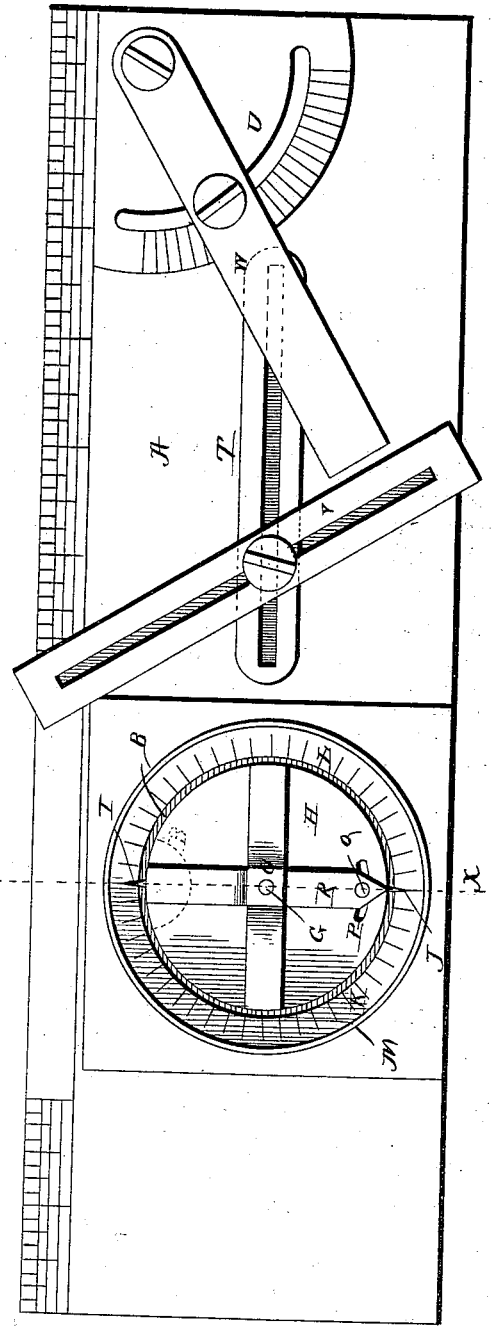
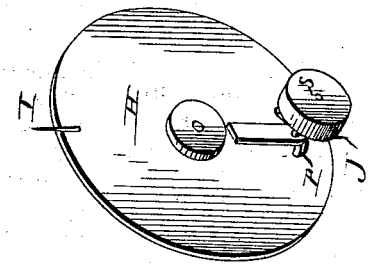
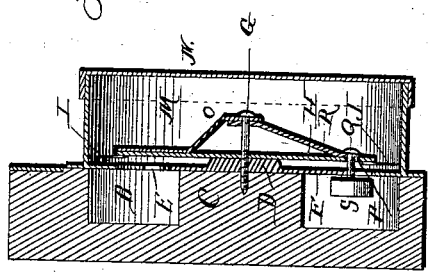
WITNESSES
F. L. Ourand
Wm. J. Littell
INVENTOR
John F. Borchardt,
by J. R. Littell,
Attorney

UNITED STATES PATENT OFFICE.

JOHN F. BORCHARDT, OF PIERCE CITY, MISSOURI.

CLINOMETER.

SPECIFICATION forming part of Letters Patent No. 326,390, dated September 15, 1885.

Application filed April 18, 1885. (No model.)

*To all whom it may concern:*

Be it known that I, JOHN F. BORCHARDT, a citizen of the United States, residing at Pierce City, in the county of Lawrence and State of Missouri, have invented certain new and useful Improvements in Clinometers; and I do hereby declare that the following is a full, clear, and exact description of the invention, which will enable others skilled in the art to which it appertains to make and use the same.

Figure 1 is a front view of my improved clinometer, showing the same in a horizontal position. Fig. 2 is a vertical transverse sectional view taken on the line $xx$ in Fig. 1, and Fig. 3 is a perspective detail view of the leveling-disk detached from its casing and shown in an inverted position.

The same letters refer to the same parts in all the figures.

This invention relates to that class of leveling-instruments which are known as "clinometers," and which are used principally for finding or determining the angles of slopes and the like.

The invention has for its object to provide a device of this class which shall possess superior advantages in point of simplicity, durability, and general efficiency, and in which the leveling device may be readily regulated and adjusted to its proper position whenever, for any reason, it shall be found to have departed therefrom.

With these ends in view the invention consists in the improved construction, arrangement, and combination of parts which will be hereinafter fully described, and particularly pointed out in the claims.

In the drawings hereto annexed, A designates a rule or "straight-edge," which forms the body of my improved clinometer, and the upper edge of which will be usually subdivided into a scale of feet and inches or some other unit of measure which it may be found desirable to employ. The said rule or "body," as it may properly be termed, is provided with a circular socket or recess, B, having a central boss, C, upon which a plate, D, the edge of which is provided with a segmental recess or indentation, E, is bolted, riveted, or otherwise secured in such a manner as to form a flange, F, surrounding the said boss. This flange F, in conjunction with the inwardly-extending flange L, covers the socket B, and forms a circular slot for the passage of the pin or screw Q, carrying the weight S. The said weight moves between the flange F and the bottom of the socket, and is protected by the former.

The plate D is provided with a central perforation, into which is inserted a pin or screw, G, forming a suitable bearing for a revolving wheel or disk, H, which is provided on diametrically-opposite sides with radially-extending fingers or pointers I and J, adapted to register with gages or indexes K, formed or inscribed upon an inwardly-extending rim or flange, L, of a rim or collar, M, which is secured to the face of the body A, and which forms a box, inclosing the wheel or disk H and other operating mechanism, it being, by preference, provided with a detachable cover, as shown at N in the drawings.

The wheel or disk H is provided with a centrally-located transverse bail, O, forming an additional bearing for the pin or screw G, whereby the steadiness of the motion of the said disk is increased. The lower part of the wheel or disk H is provided near its edge with a segmental concentric slot, P, for the accommodation or passage of a screw, Q, passing through a perforation in the outer end of an arm, R, which is mounted upon the pin or screw G between the disk or wheel H and the bail O, and consequently practically forming a part of and revolving with the said wheel or disk.

Upon the inner end of the screw Q is mounted a weight, S, which, by tightening the said screw, may be retained securely in any position to which it may be adjusted, the adjustment being effected by moving the arm R, when the screw Q is loosened, toward either end of the segmental slot P.

In putting the parts of the device together, the recess E in the plate D serves to admit of the entrance or exit of the weight S, attached to the wheel or disk H, in the manner described. This admits of the apparatus being easily taken apart for the purpose of saving the bearings when the latter are so finely adjusted as to be easily injured by carrying the apparatus in its operative position.

The body A is to be provided with straight and segmental slots T and U, having adjustable rules or indicators V and W, arranged and adapted to be used in a manner which is common in this class of devices.

The operation of this invention will be readily understood from the foregoing description, taken in connection with the drawings hereto annexed, by those who are skilled in the art to which it appertains.

The construction is simple, durable, and inexpensive.

I would have it understood that I reserve to myself the right to all modifications which may be resorted to without departing from the spirit of my invention.

Having thus described my invention, I claim and desire to secure by Letters Patent of the United States—

1. In a clinometer, the combination of the straight-edge or body having a socket provided with a central boss, a plate secured upon the said boss and having an overhanging flange, and a revolving indicator wheel or disk having a weight adapted to fit and move between the said flange and the bottom of the socket, substantially as and for the purpose herein set forth.

2. In a clinometer, the combination of a straight-edge or body having a socket provided with a central boss, a plate secured upon the said boss and having an overhanging flange, a rim or collar having an interior annular graduated flange or gage, a cover for the same, and a revolving disk or wheel having a weight arranged and adapted to move between the bottom of the socket and the flanged boss of the same, substantially as and for the purpose set forth.

3. In a clinometer, the combination, with a suitably-socketed straight-edge or body, of a wheel or disk mounted upon a suitable pin or screw, and an arm mounted upon the same pin or screw and having a screw extending through a segmental slot in the rim of the said wheel or disk and carrying a weight, substantially as herein described, for the purpose set forth.

4. In a clinometer, the combination of a straight-edge or body having a socket, a flanged boss on the said socket, the flange of which has a recess or indentation, a pivoting pin or screw, a wheel or disk having suitable hands or pointers and provided with a segmental slot near its lower edge and with a central transverse bail on its front side, and an adjustable arm mounted upon the pivoting pin or screw under the bail and having a weight mounted upon a screw extending through the lower end of the said arm and through the slot in the wheel or disk, with which the said weight is thus adjustably connected, substantially as and for the purpose set forth.

In testimony whereof I affix my signature in presence of two witnesses.

JOHN F. BORCHARDT.

Witnesses:
ROBERT J. ALEXANDER,
A. MCKINNEY.